United States Patent
Sielski (10) Patent No.: US 11,554,490 B2
(45) Date of Patent: Jan. 17, 2023

(54) MONITORING REAL-TIME DATA OF A ROBOTIC MANIPULATOR

(71) Applicant: Robert Bosch GmbH, Stuttgart (DE)

(72) Inventor: Thiago Sielski, Charleston, SC (US)

(73) Assignee: Robert Bosch GmbH, Stuttgart (DE)

( * ) Notice: Subject to any disclaimer, the term of this patent is extended or adjusted under 35 U.S.C. 154(b) by 224 days.

(21) Appl. No.: 17/116,736

(22) Filed: Dec. 9, 2020

(65) Prior Publication Data

US 2022/0176562 A1   Jun. 9, 2022

(51) Int. Cl.
*B25J 13/00* (2006.01)
*B25J 9/16* (2006.01)
*B25J 9/00* (2006.01)

(52) U.S. Cl.
CPC ........... *B25J 9/1674* (2013.01); *B25J 9/0084* (2013.01); *B25J 9/1653* (2013.01)

(58) Field of Classification Search
CPC ...... B25J 9/0084; B25J 9/1674; B25J 9/1653; G05B 19/4183; G05B 19/4184; G05B 19/32234; G05B 23/0283; G05B 23/0297
USPC .............................. 700/245; 701/36; 702/188
See application file for complete search history.

(56) References Cited

U.S. PATENT DOCUMENTS

| | | | |
|---|---|---|---|
| 8,965,574 B2 | 2/2015 | Joly et al. | |
| 9,104,650 B2 | 8/2015 | Hosek et al. | |
| 9,987,748 B2 | 6/2018 | Stubbs et al. | |
| 10,380,809 B2* | 8/2019 | Pereira | G05B 23/0283 |
| 10,392,918 B2* | 8/2019 | Harkless | E21B 33/13 |
| 10,471,593 B2 | 11/2019 | Tsuchiya | |
| 10,489,263 B2* | 11/2019 | Grimm | G05B 23/0235 |
| 11,226,615 B2* | 1/2022 | Somercik | G05B 23/0264 |
| 2017/0351243 A1 | 12/2017 | Sawada et al. | |
| 2019/0143521 A1 | 5/2019 | Gawlik et al. | |
| 2019/0206565 A1* | 7/2019 | Shelton, IV | A61B 90/37 |
| 2020/0133257 A1* | 4/2020 | Cella | G05B 19/4185 |

OTHER PUBLICATIONS

Staubli, I4.0 Workshop Presentation, publicly available at least as early as Dec. 4, 2020, 66 pages.

* cited by examiner

*Primary Examiner* — Dalena Tran
(74) *Attorney, Agent, or Firm* — Michael Best & Friedrich LLP (57) ABSTRACT

A system and method for monitoring real-time operational data of a robotic manipulator. The system includes a robotic manipulator, a robotic manipulator controller, an electronic processor, a memory, and an output device. The memory includes a robotic manipulator profile, the robotic manipulator profile including a history of robotic manipulator operational data. The robotic manipulator controller is configured to generate a data packet based on signals relating to various operations of the robotic manipulator, and transmit the packet to the electronic processor. The electronic processor is configured to process the data contained in the data packet, update the robotic manipulator profile based on the processed data, and generate an alert that is output to the output device based on the updated robotic manipulator profile.

18 Claims, 8 Drawing Sheets

| | Bytes | Data Contained | Unit | VAL3 Acquisition Function |
|---|---|---|---|---|
| 510 | 0 - 23 | Instantaneous Joint Torques | Newton Meter | getJointForce |
| 520 | 24 - 47 | Instantaneous Joint Error | Degree | getPositionErr |
| 530 | 48 - 71 | Instantaneous Joint Positon | Degree | herej |
| 540 | 72 - 95 | Instantaneous Tool/Flange Cartesian Position | (X,Y,Z,RX,RY,RZ) Millimeters and Radian | jointToPoint |
| 550 | 96 - 99 | Instantaneous Tool Speed | Millimeters per Second | getSpeed |
| 560 | 100 - 103 | Instantaneous Monitor Speed Percentage | Percentage | getMonitorSpeed |

| Bytes | Data Contained | Unit | VAL3 Acquisition Function |
|---|---|---|---|
| 0 - 23 | Instantaneous Joint Torques | Newton Meter | getJointForce |
| 24 - 47 | Instantaneous Joint Error | Degree | getPositionErr |
| 48 - 71 | Instantaneous Joint Positon | Degree | herej |
| 72 - 95 | Instantaneous Tool/Flange Cartesian Position | (X,Y,Z,RX,RY,RZ) Millimeters and Radian | jointToPoint |
| 96 - 99 | Instantaneous Tool Speed | Millimeters per Second | getSpeed |
| 100 - 103 | Instantaneous Monitor Speed Percentage | Percentage | getMonitorSpeed |

MONITORING REAL-TIME DATA OF A ROBOTIC MANIPULATOR

FIELD

Embodiments relate to robotic manipulator systems.

BACKGROUND

Robotic manipulators are used in manufacturing to move and position parts or tools within a work envelope. Robotic manipulators, such as six-axis robotic arms, are equipped with a plurality of actuators controlled by a controller. The controller is configured to provide commands to the actuators by interpreting movement instructions given by a user or a program. When controlled by the controller, the actuators can move one or more links of the robotic manipulator by producing a rotational force at one or more joints that connect the links.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

SUMMARY

As noted, robotic manipulators, such as six-axis robotic arms, are equipped with a plurality of actuators controlled by a controller. The controller is configured to provide commands to the actuators by interpreting movement instructions given by a user or a program. When controlled by the controller, the actuators move one or more links of the robotic manipulator by producing a rotational force at one or more joints which connect the links. Wear of robotic manipulator components may cause a fault and result in unplanned downtime.

Embodiments presented herein include systems and methods for monitoring real-time data of a robotic manipulator.

For example, one embodiment provides a system for monitoring operational data of a robotic manipulator. The system includes a memory that stores a robotic manipulator profile. The robotic manipulator profile contains a history of robotic manipulator operational data. The system further includes an output device and a robotic manipulator controller. The robotic manipulator controller is configured to generate a plurality of signals including information about an instantaneous joint torque, an instantaneous joint error, an instantaneous tool position, an instantaneous flange position, an instantaneous tool speed, and an instantaneous speed percentage. The robotic manipulator controller is further configured to generate a data packed based on the plurality of signals. The data packed contains a plurality of data segments of a predefined size. Each data segment in the plurality of data segments includes information relating to one of the instantaneous joint torque, the instantaneous joint error, the instantaneous tool position, the instantaneous flange position, the instantaneous tool speed, and the instantaneous speed percentage. The robotic manipulator controller is further configured to transmit the data packet to an electronic processor. The electronic processor is configured to receive the robotic manipulator profile from the memory, determine one or more operational characteristics of the robotic manipulator based on the data packet, update the robotic manipulator profile based on the one or more operational characteristics, generate an alert based on the updated robotic manipulator profile, and output the alert to an output device.

Another embodiment provides a method for monitoring operational data of a robotic manipulator. The method includes generating, with a robotic manipulator controller, a plurality of signals, the plurality of signals including information about an instantaneous joint torque, an instantaneous joint error, an instantaneous tool position, an instantaneous flange position, an instantaneous tool speed, and an instantaneous speed percentage. The method further includes generating, with the robotic manipulator controller, a data packet based on the plurality of signals, the data packet containing a plurality of data segments of a predefined size, each data segment in the plurality of data segments including information relating to one of the group consisting of the instantaneous joint torque, the instantaneous joint error, the instantaneous tool position, the instantaneous flange position, the instantaneous tool speed, and the instantaneous speed percentage. After generating the data packet, the method includes transmitting, with the robotic manipulator controller, the data packet to an electronic processor. The method further includes receiving, at the electronic processor, a robotic manipulator controller profile from a memory, the robotic manipulator profile includes a history of robotic manipulator operational data, and determining, with the electronic processor, one or more operational characteristics of the robotic manipulator based on the data packet. In response to determining the one or more operational characteristics, the method includes updating, with the electronic processor, the robotic manipulator profile based on the one or more operational characteristics, generating, with the electronic processor, an alert based on the updated robotic manipulator profile, and outputting, with the electronic processor, the alert to an output device.

DETAILED DESCRIPTION

Before any embodiments are explained in detail, it is to be understood that this disclosure is not intended to be limited in its application to the details of construction and the arrangement of components set forth in the following description or illustrated in the following drawings. Embodiments are capable of other configurations and of being practiced or of being carried out in various ways.

It should also be noted that a plurality of hardware and software-based devices, as well as a plurality of different structural components may be used to implement the embodiments presented herein. In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects may be implemented in software (for example, stored on non-transitory computer-readable medium) executable by one or more processors. As such, it should be noted that a plurality of hardware and software-based devices, as well as a plurality of different structural components may be utilized to implement the embodiments presented. For example, "control units" and "controllers" described in the specification can include one or more electronic processors, one or more memory modules including non-transitory computer-readable medium, one or more input/output interfaces, and various connections (for example, a system bus) connecting the components. In some instances, various components, for example, hardware or software components may be situated locally or remotely, for example, in a cloud environment.

For ease of description, each of the example systems presented herein is illustrated with a single exemplar of each of its component parts. Some examples may not describe or illustrate all components of the systems. Other embodiments may include more or fewer of each of the illustrated components, may combine some components, or may include additional or alternative components.

Figure 1:
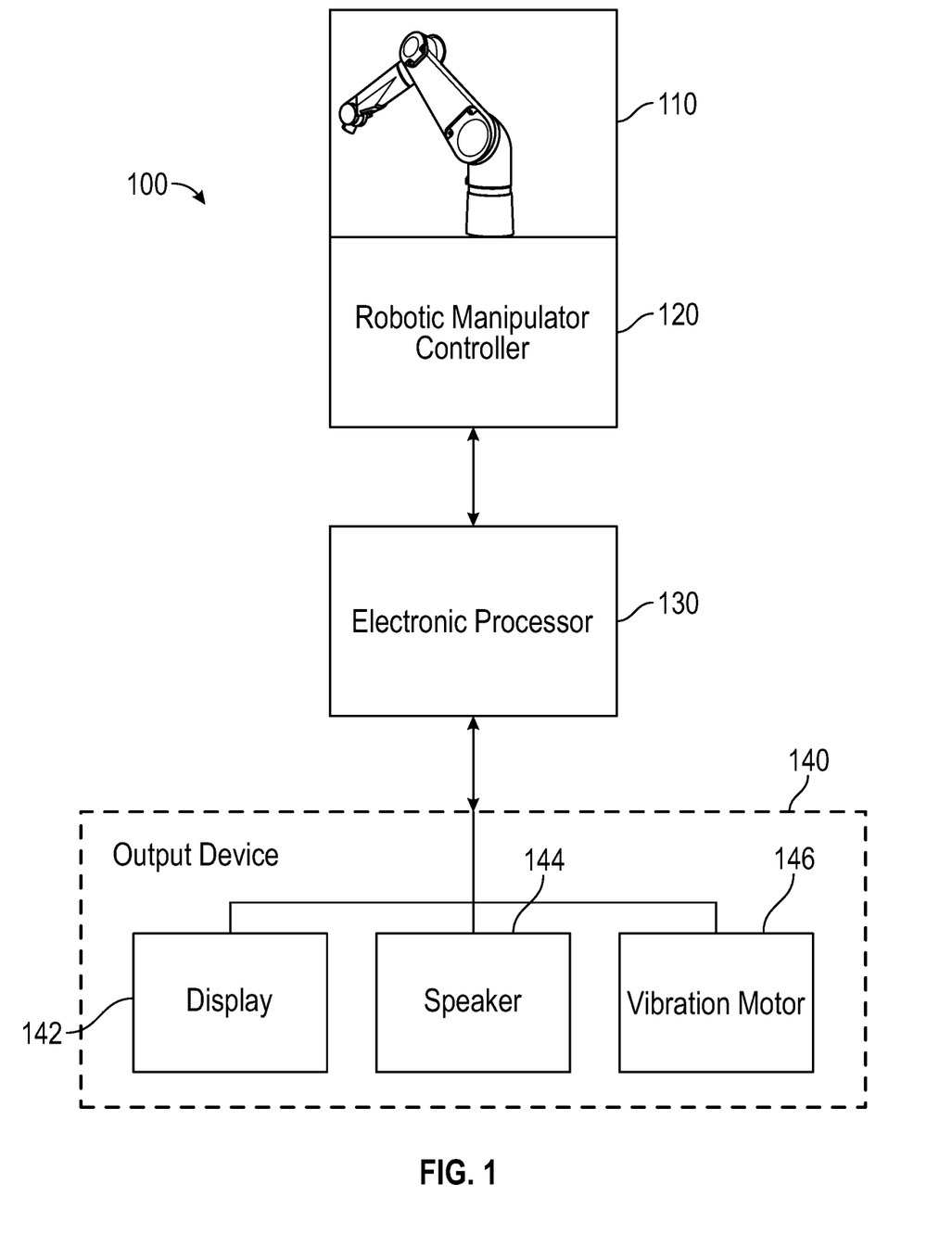
FIG. 1 is a block diagram of a robotic manipulator monitoring system, according to some embodiments.

FIG. 1 is a block diagram of one example embodiment of a robotic manipulator monitoring system 100. The robotic manipulator monitoring system 100 includes a robotic manipulator 110. While the robotic manipulator 110 is described (in particular, regarding the robotic manipulator system in FIG. 3) as being a six-axis robotic arm, this should not be considered limiting. The systems and methods herein are applicable to other types of robotic manipulators.

The robotic manipulator monitoring system 100 includes a robotic manipulator controller 120, an electronic processor 130, and an output device 140. The robotic manipulator 110, robotic manipulator controller 120, the electronic processor 130, and the output device 140 are communicatively coupled to each other via wired connections, wireless connections, or some combination thereof. All or parts of the connections used in the robotic manipulator monitoring system 100 may be implemented using various communication networks, for example, a Bluetooth™ network, a control area network (CAN), a wireless local area network (for example, Wi-Fi), an Ethernet network, the Internet, and other networks and connections. The use of communication networks for the interconnection between and exchange of information among the various modules and components would be apparent to a person skilled in the art in view of the description provided herein.

Figure 2:
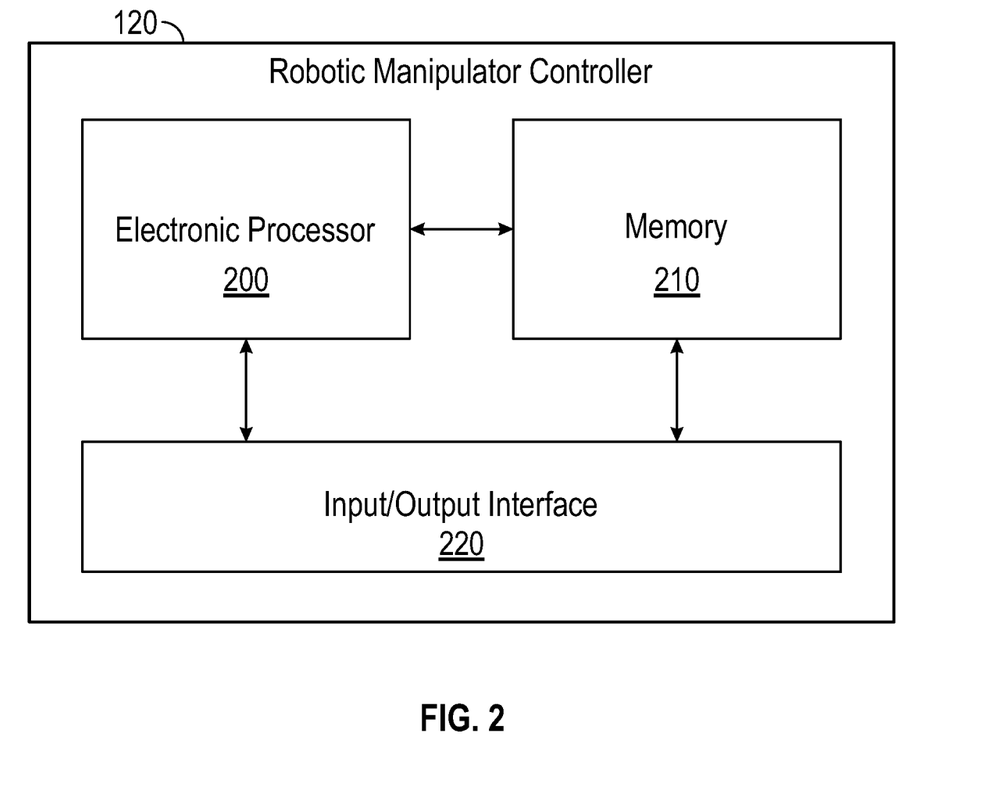
FIG. 2 is a diagram of a robotic manipulator, according to some embodiments.

In some embodiments, the robotic manipulator controller 120 includes a plurality of electrical and electronic components that provide power, operational control, and protection to the components and modules within the robotic manipulator controller 120. As shown in FIG. 2, the robotic manipulator controller 120 includes, among other things, an electronic processor 200 (for example, an electronic microprocessor, microcontroller, or other suitable programmable device), a memory 210, and an input/output interface 220. The electronic processor 200, the memory 210, and the input/output interface 220, as well as the other various modules are connected by one or more control or data buses. In some embodiments, the robotic manipulator controller 120 is implemented partially or entirely in hardware (for example, using a field-programmable gate array ("FPGA"), an application specific integrated circuit ("ASIC"), or other devices.

The electronic processor 200 obtains and provides information (for example, from the memory 210 and/or the input/output interface 220), and processes the information by executing one or more software instructions or modules, capable of being stored, for example, in a random access memory ("RAM") area of the memory 210 or a read only memory ("ROM") of the memory 210 or another non-transitory computer readable medium (not shown). The software can include firmware, one or more applications, program data, filters, rules, one or more program modules, and other executable instructions.

The memory 210 can include one or more non-transitory computer-readable media and includes a program storage area and a data storage area. As used in the present application, "non-transitory computer-readable media" comprises all computer-readable media but does not consist of a transitory, propagating signal. The program storage area and the data storage area can include combinations of different types of memory, for example, read-only memory ("ROM"), random access memory ("RAM"), electrically erasable programmable read-only memory ("EEPROM"), flash memory, or other suitable digital memory devices. The electronic processor 200 is connected to the memory 210 and executes software, including firmware, one or more applications, program data, filters, rules, one or more program modules, and other executable instructions. The electronic processor 200 retrieves from the memory 210 and executes, among other things, instructions related to the control processes and methods described herein.

The input/output interface 220 is configured to receive input and to provide system output. The input/output interface 220 obtains information and signals from, and provides information and signals to (for example, over one or more wired and/or wireless connections) devices and/or components both internal and external to the robotic manipulator monitoring system 100.

In some embodiments, the robotic manipulator controller 120 may include additional, fewer, or different components. For example, in some embodiments, the controller electronic 120 may include a transceiver or separate transmitting and receiving components, for example, a transmitter and a receiver. Some or all of the components of robotic manipulator controller 120 may be dispersed and/or integrated into other devices/components of the robotic manipulator monitoring system 100.

Figure 3:
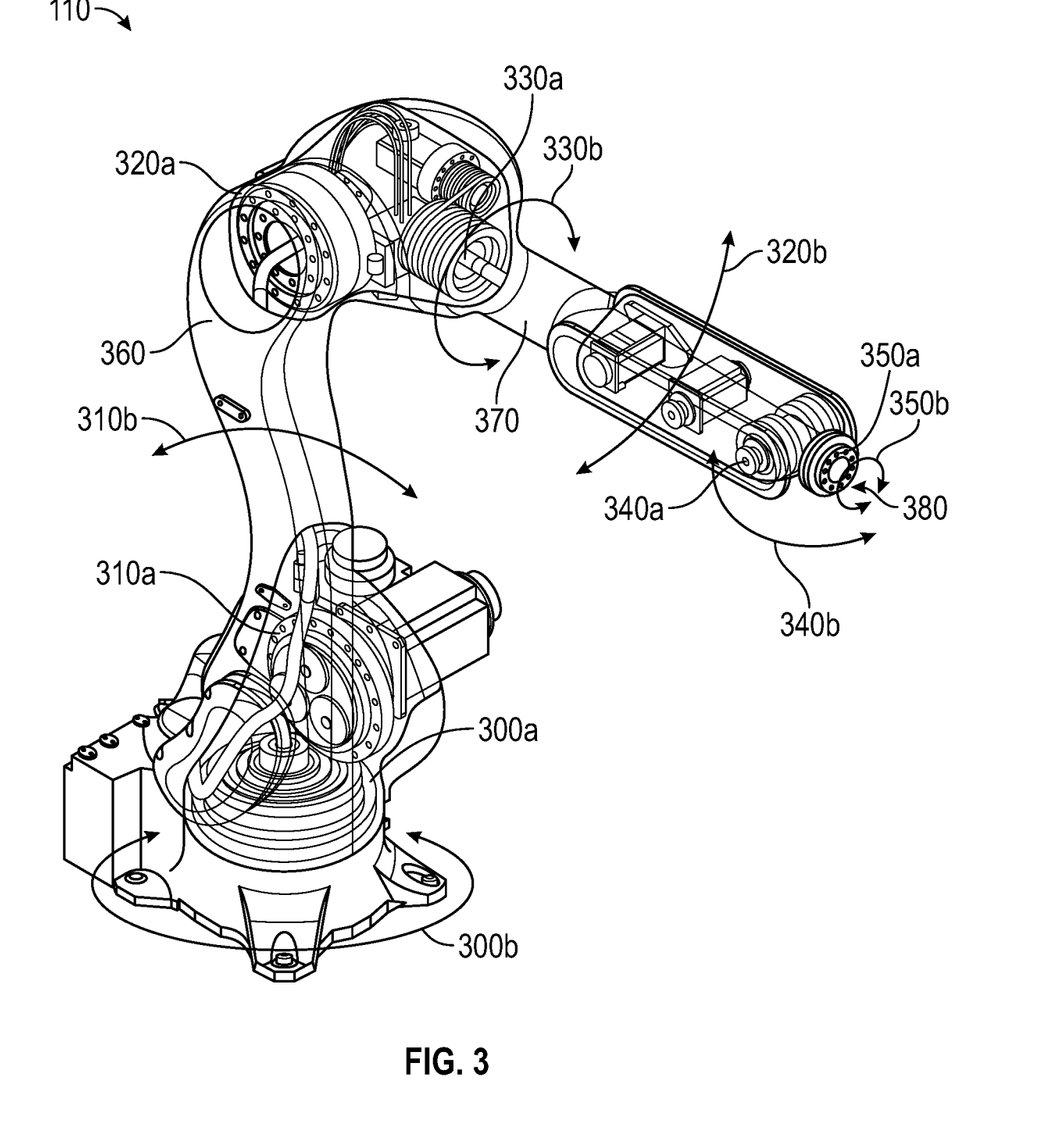
FIG. 3 is block diagram of a robotic manipulator controller of the robotic manipulator monitoring system of FIG. 1, according to some embodiments.

In some embodiments, the robotic manipulator 110 includes a plurality of electrical and electronic components that provide power, operational control, and protection to the components and modules within the robotic manipulator 110. As shown in FIG. 3, the robotic manipulator 110 is a polar (or spherical) robot, such as a six-axis robotic arm, this should not be considered limiting. The systems and methods described herein are applicable to other types of robotic manipulators (for example, articulated robots, SCARA robots, delta robots, cylindrical robots, or the like).

The robotic manipulator 110 includes a plurality of actuators 300a, 310a, 320a, 330a, 340a, 350a that are located at various positions of the robotic manipulator 110. Each of the plurality of actuators 300a, 310a, 320a, 330a, 340a, 350a correspond to one of each of a plurality of axes 300b, 310b, 320b, 330b, 340b, 350b. An axis at which the robotic manipulator 110 may move, for example, pivot or rotate is referred to as a joint.

Actuator 300a is located at the base of the robotic manipulator 110, allows the robotic manipulator 110 to rotate and left to right around axis 300b in a 180 degree range from the center point. The joint that is defined at axis 300b of actuator 300a is herein referred to as J1 Actuator 310a allows the robotic manipulator 110 to extend forward and backward along axis 310b and provides the movement of the lower link 360. The joint that is defined at axis 310b of actuator 310a is herein referred to as J2. Actuator 320a allows the upper link 370 to raise and lower along the axis 320b. The joint that is defined at axis 320b of actuator 320a is herein referred to as J3. Movement at J3 provides for extension of the vertical reach of the robotic manipulator 110. Actuator 330a rotates the upper link 370 in a circular motion around axis 330b. The joint that is defined at axis 330b of actuator 330a is herein referred to as J4. J4 positions the end effector 380 of the robotic manipulator 110 and may be used to rotate objects (for example, a part, a tool, or the like) between horizontal and vertical orientations. Actuator 340a allows the end effector 380 of the robotic manipulator 110 to rotate up and down along axis 340b and provides pitch and yaw motion. The joint that is defined at axis 340b of actuator 340a is herein referred to as J5. Actuator 350a allows for free rotation of the end effector 380 in a circular motion around axis 350b. The joint that is defined at axis 350b of actuator 350a is herein referred to as J6.

The robotic manipulator controller 120 may control the movement of one or more links of the robotic manipulator 120 by, for example, providing a command, from the electronic processor 200, to one or more of the plurality of actuators 300a, 310a, 320a, 330a, 340a, 350a.

Returning to FIG. 1, in some embodiments, the electronic processor 130 includes components similar to the robotic manipulator controller 120 and, accordingly, the description of the components of the robotic manipulator controller 120 similarly applies to the electronic processor 130. Typically, the robotic manipulator controller 120 is only used for the control of the robotic manipulator 110. Thus, a secondary processing device, such as the electronic processor 130, may be implemented in the robotic manipulator monitoring system 100 in order to process data generated by the robotic manipulator controller 120 and perform diagnostic work. The electronic processor 130 may, for example, be a desktop computer, a laptop, or the like. It is to be noted that although the functions of electronic processor 130 are described herein as being performed entirely by the electronic processor 130, it is possible the one or more of the functions of electronic processor 130 to be performed entirely by the robotic manipulator controller 120. In some embodiments, the electronic processor 130 provides instructions to the robotic manipulator controller 120 for controlling a movement of one or more of the plurality of actuators 300a, 310a, 320a, 330a, 340a, 350a. The electronic processor 130 executes, among other things, instructions related the control processes and methods described herein.

The output device 140 is communicatively coupled to the electronic processor 130. In some embodiments, the output device 140 and the electronic processor 130 are components of a single device (for example, a smartphone, tablet, or desktop computer). The output device 140 receives input from the electronic processor 130, and provides feedback (for example, audio, visual, haptic, or a combination thereof) to a user based on the received information. In some embodiments, the output device 140 is a human machine interface (HMI) wherein the output device 140 is configured to receive input from the user. The output device provides suitable input mechanisms, for example, a button, a touch screen display having menu options, and the like for providing inputs from the driver that can be used by the electronic processor 130 to provide instructions to the robotic manipulator controller 120 as it controls the robotic manipulator 110.

The output device 140 includes a display 142, for displaying visual output. The visual output may include, for example, a graphic user interface having graphical elements or indicators (for example, fixed or animated icons), lights, colors, text, images, combinations of the foregoing, and the like. The display 142 may include a liquid crystal display (LCD), an organic light-emitting diode (OLED) display, or though other suitable device. In some embodiments, the graphical user interface (GUI) (for example, generated by the electronic processor 130, from instructions in the memory), enables a user to interact with the robotic manipulator 110 or the robotic manipulator controller 120. The output device 140 may also include an audio device to output audio output to the user, for example, a chime, buzz, voice output, or other suitable sound through, for example, a speaker 144 included in the output device 140 or separate from the output device 140. The output device 140 may also include components configured to provide haptic outputs to the user, for example, to vibrate a mobile computing device, for example, through the use of a vibration motor 146 included in the output device 140 or separate from the output device 140. In some embodiments, the electronic processor 130 generates a signal which causes the visual, audio, and haptic outputs to be produced by the output device 140.

Figure 4:
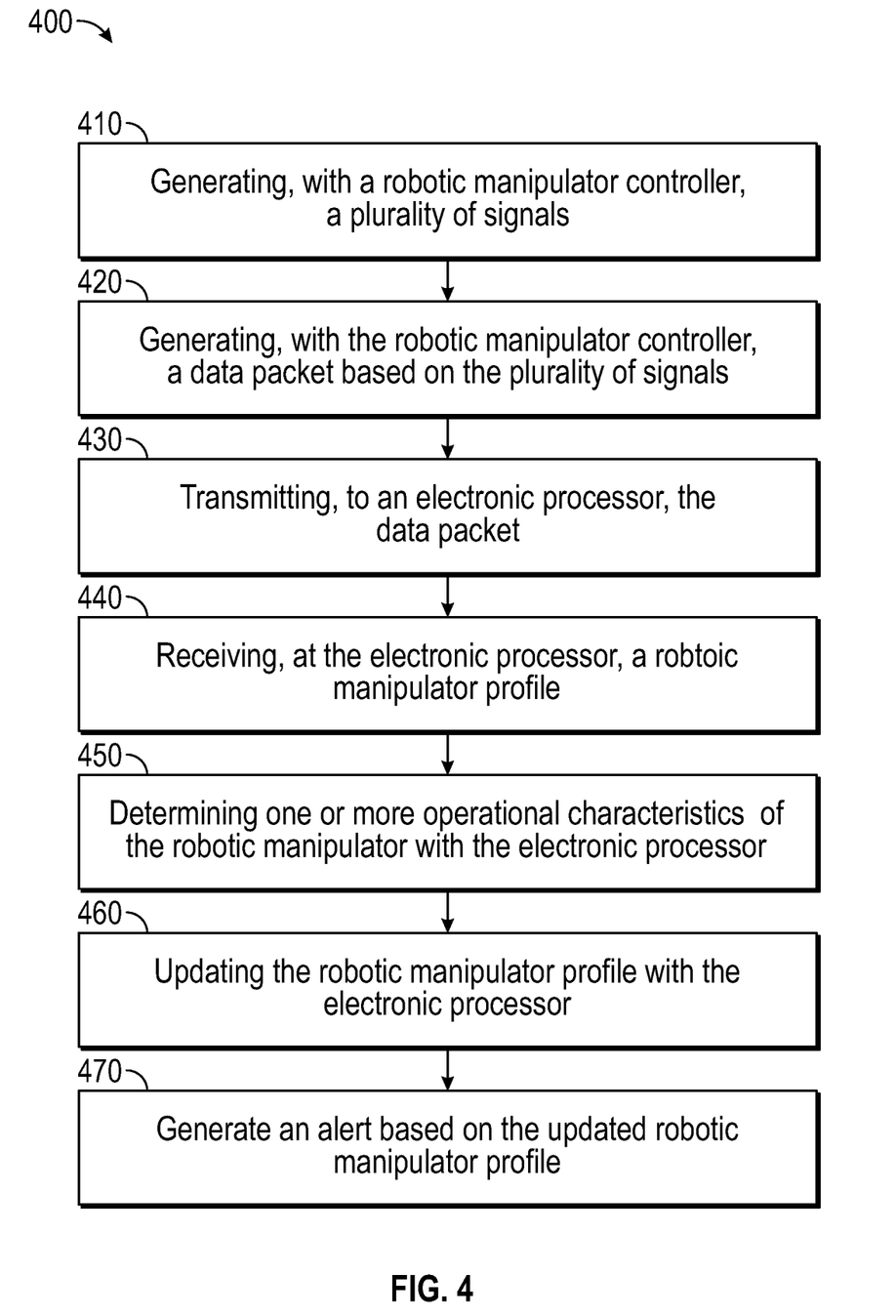
FIG. 4 is a flowchart of a method for monitoring real-time data the robotic manipulator of FIG. 2, according to some embodiments.

FIG. 4 illustrates an exemplary method 400 for monitoring real-time data of the robotic manipulator 110. As an example, the method 400 is explained in terms of the robotic manipulator controller 120 and the electronic processor 130. However, it should be understood that portions of the method 400 may be distributed among multiple devices (for example, one or more additional controllers/processors of the robotic manipulator monitoring system 100).

At block 410, the robotic manipulator controller 120 generates a plurality of signals (for example, for controlling a movement of the robotic manipulator 110). At block 420, the robotic manipulator controller 120 generates a data packet based on the plurality of signals. In some embodiments, the data packet is generated by a subroutine that is stored in the memory 210 and executed by the electronic processor 200 of the robotic manipulator controller 120. The subroutine includes instructions for parsing data generated by the robotic manipulator 110 and the robotic manipulator controller 120. In some embodiments, the subroutine is implemented using C, C #, C++, Python, or the like. In other embodiments, the subroutine is implemented using a dedicated robotic programming language associated with the robotic manipulator 110 or robotic manipulator controller 120 (for example, VAL 3, KRL, RAPID, or the like). It should be understood that while described herein as generating a single data packet at block 420, the robotic manipulator controller 120 may generate a plurality of data packets on a continual basis based on the plurality of signals generated at block 410.

Figure 5:
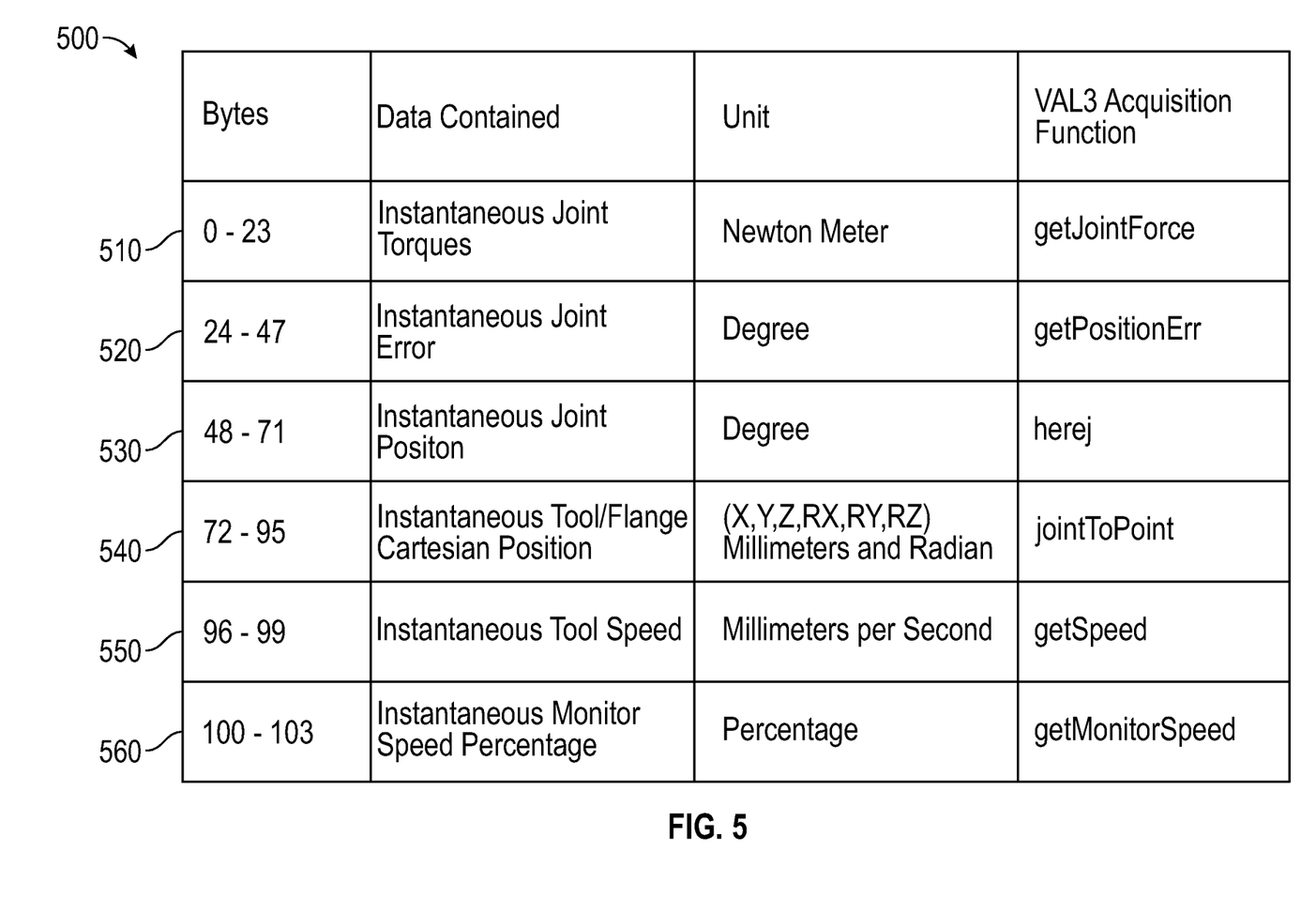
FIG. 5 is a visual representation of a data packet generated by the robotic manipulator controller of FIG. 3, according to some embodiments.

FIG. 5 is a visual representation of a data packet 500 generated by the robotic manipulator controller 120 at block 420. The data packet 500 includes a plurality of data segments 500, 510, 520, 530, 540, 550. Each data segment of the plurality of data segments 500, 510, 520, 530, 540, 550 contains information about a movement or position of one or more components of the robotic manipulator 110 (for example, a joint torque, a joint position, and the like) and has a predefined size. The information contained with each data segment 510, 520, 530, 540, 550, 560 includes an encoded value associated with one or more components of the robotic manipulator 110. Data segment 510 is defined by 24 bytes and contains information regarding an instantaneous joint torque of, for example, of one of the joints J1-J6 of the robotic manipulator 110. Data segment 520 is define 24 bytes and contains information regarding an instantaneous joint error of, for example, one of the joints J1-J6 of the robotic manipulator 110. Data segment 530 is defined by 24 bytes and contains information regarding an instantaneous joint position of, for example, one of the joints J1-J6 of the robotic manipulator 110. Data segment 540 is defined by 24 bytes and contains information regarding an instantaneous tool/flange cartesian position of the robotic manipulator 110. Data segment 550 is defined by 4 bytes and contains information regarding an instantaneous tool speed. Data segment 560 is defined by 4 bytes and contains information regarding an instantaneous monitor speed percentage. In some embodiments, a value that is associated the information contained within each data segment 510, 520, 530, 540, 550, 560 is generated based on parsing data included in the plurality of signals generated by the robotic manipulator controller 120.

Returning to FIG. 4, at block 430, the robotic manipulator controller 120 transmits the data packet generated at block 420 to the electronic processor 130. In some embodiments, the robotic manipulator controller 120 transmits the generated data packet to a local memory associated with the electronic processor 130. In other embodiments, the data packet is transmitted to a memory at remote location. An embodiment of a method for data packet transmission is discussed in FIG. 7 below. At block 440, the electronic processor 130 receives a robotic manipulator profile. The robotic manipulator profile contains one or more identifiers of the robotic manipulator 110, robotic manipulator controller 120, an operational state of the robotic manipulator 110, or a combination of the foregoing (for example, an IP address, a display name, a serial number, a location, an organization department, a time, or the like), and a history of robotic manipulator operational data of the robotic manipulator 120. In some embodiments, the robotic manipulator profile includes information regarding type of the robotic manipulator 110 and a communication protocol associated with the robotic manipulator 110. In some embodiments, the robotic manipulator profile is stored on a local memory associated with the electronic processor 130. In other embodiments, the robotic manipulator profile is stored in a memory at a remote location.

At block 450, the electronic processor 130 determines one or more operational characteristics of the robotic manipulator 110 based on the data packet transmitted at block 430. An operational characteristic of the robotic manipulator 110 may include a value associated with, for example, an instantaneous joint torque, an instantaneous joint error, an instantaneous tool position, an instantaneous flange position, an instantaneous tool speed, or an instantaneous speed percentage. At block 460, the electronic processor 130 updates the robotic manipulator profile based on the one or more operational characteristic determined at block 450.

At block 470, the electronic processor 130 generates an alert based on the updated robotic manipulator profile. In some embodiments, the alert generated by the electronic processor 130 is output to the output device 140 and includes visual, audio, and/or haptic outputs. The alert relates to the operational state of the robotic manipulator 110. In some embodiments, the alert may indicate a fault in the robotic manipulator 110. In other embodiments, electronic processor 130 may determine that a value included the history of robotic manipulator operational data of the robotic manipulator profile exceeds a predetermined threshold. For example, the electronic processor 130 may determine that the value of the instantaneous joint torque of J1 has exceeds a predetermined value. In this example, the alert generated by the electronic processor 130 may text displayed on the output device 140 indicating an excessive joint torque value at J1. In some embodiments, the alert includes information about control functionality or suggested maintenance. In some embodiments, the alert generated by the electronic processor 130 is based on a plurality of values included in the history of robotic manipulator operational data. For example, the electronic processor 130 may determine that a plurality of historical instantaneous joint torque values of J1 have exceeded a predetermined value during a predetermined duration of time. In some embodiments, the robotic manipulator 110 is a plurality of robotic manipulators and the alert is based a plurality of values stored in a plurality of robotic manipulator profiles for each one of the plurality of robotic manipulators.

In some embodiments, the alert generated at block 470 of FIG. 4 includes a visual representation of data included in the robotic manipulator profile. In some embodiments, the electronic processor 130 generates the alert in the form of an electronic message (for example, an email, a text message, or the like). In other embodiments, the electronic processor 130 receives the robotic manipulator profile at block 440 and generates a visual representation based on data included in the robotic manipulator profile. In some embodiments, the electronic processor generates the visual representation after updating the robotic manipulator profile at block 460. In some embodiments, the electronic processor 130 displays the visual representation on the output device 140. The visual representation may include, for example, a graph, a table, a chart, or the like.

Figure 6:
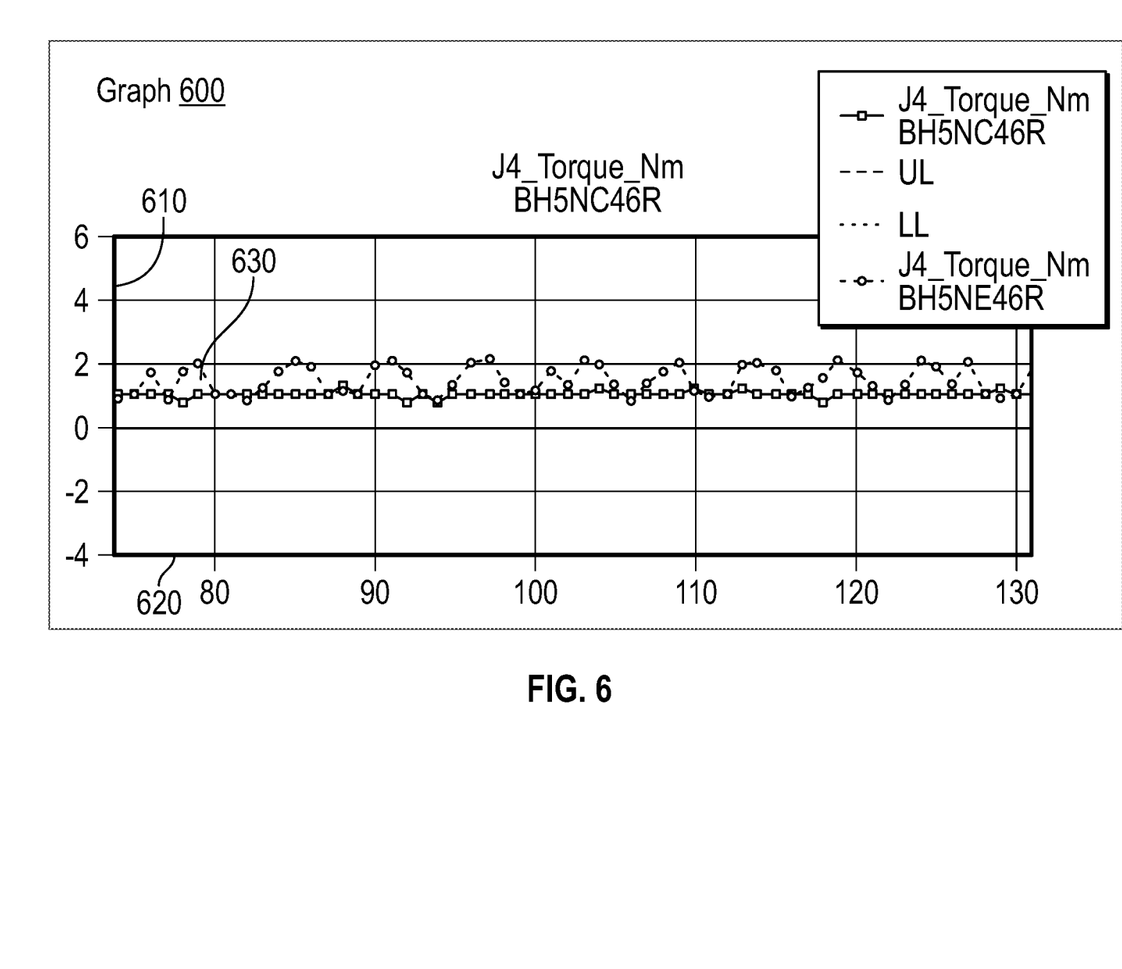
FIG. 6 is a visual representation of an output generated by the robotic manipulator monitoring system of FIG. 1, according to some embodiments.

FIG. 6 is an example illustration of a graph 600 generated by the electronic processor 130. The graph 600 is a visual representation of torque values at joint J4 of the robotic manipulator 110. It should be understood that while the graph 600 is described herein as representing torque values of joint J4, the graph 600 may represent other or a combination of data included in the robotic manipulator profile (for example, a joint error, tool position, flange position, tool speed, speed percentage, or the like). In the example illustrated in FIG. 6, the x-axis 610 of the graph 600 represents a time value in seconds. The y-axis 620 of the graph 600 represents a torque value in N·m. Each point on the line 630 represents an instantaneous torque value of the joint J4 obtained by the electronic processor 130 from the robotic manipulator profile.

Figure 7:
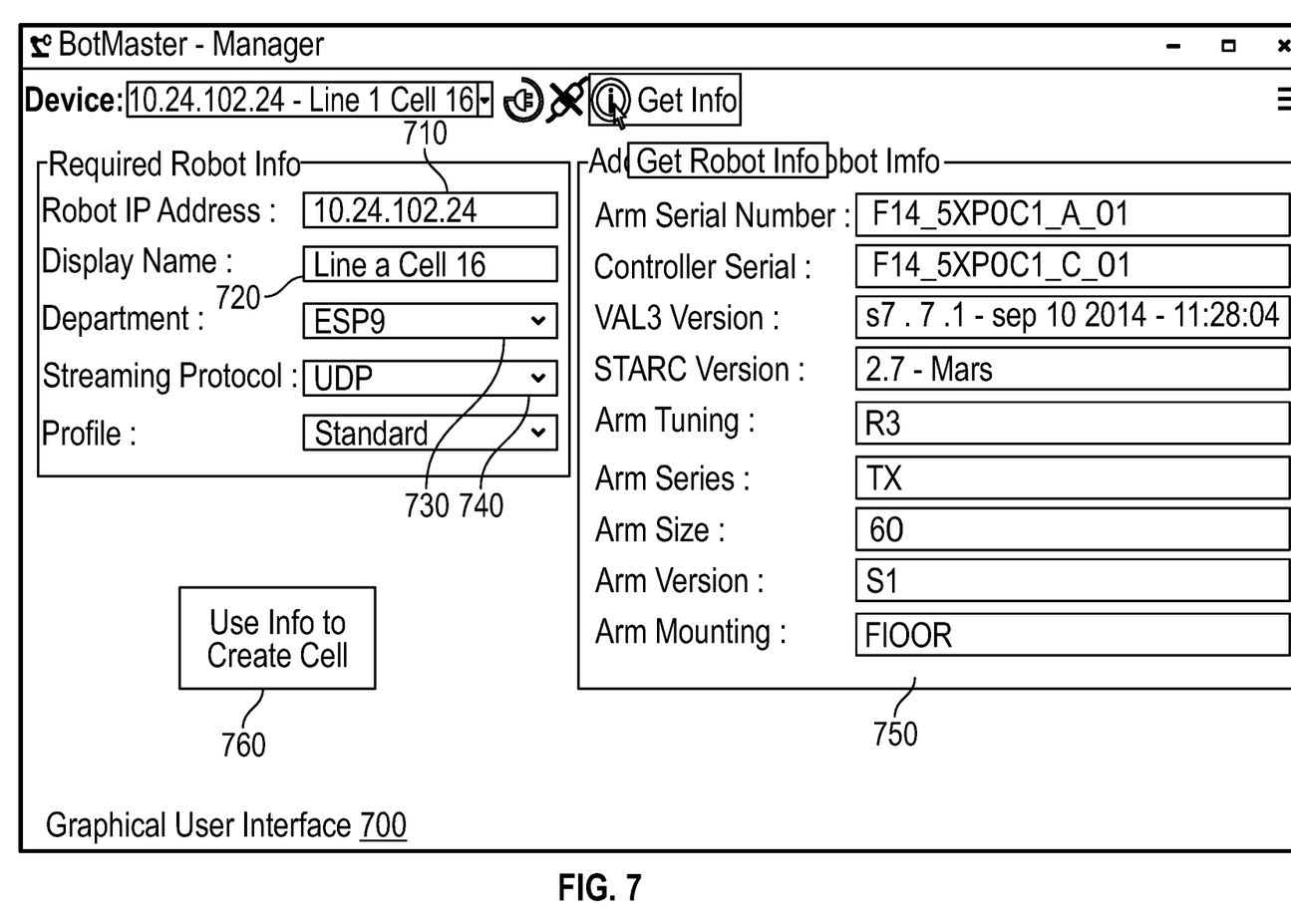
FIG. 7 is a graphical user interface for generating a robotic manipulator profile of robotic manipulator of FIG. 2, according to some embodiments.

FIG. 7 is a graphical user interface 700 for generating a robotic manipulator profile for the robotic manipulator 110. In some embodiments, the graphical user interface 700 is generated by the electronic processor 130 and displayed on the output device 140. The graphical user interface 700 provides suitable input mechanisms for a user (for example, input fields 710, 720, drop down lists 730, 740, and button 760). In some embodiments, the graphical user interface 700 includes additional, fewer, or different elements. A user may interact with the graphical user interface 700 with various input/output devices (for example, a computer mouse, keyboard, or touchscreen). Input field 710 allows the user to enter an IP address of the robotic manipulator 110. Input field 720 allows a user to enter a display name of the robotic manipulator 110. Drop down list 730 allows the user to select a department of an organization in which the robotic manipulator 110 is associated. Drop down list 740 allows the user to select a communication (or streaming) protocol associated with the robotic manipulator 110 (for example, user datagram protocol (UDP) or transmission control protocol (TCP)). In some embodiments, the graphical user interface 700 may allow the user to include additional robot information 750. The additional robot information 750 may include information associated with the robotic manipulator 110, for example, a serial number of the robotic manipulator 110, a serial number of the robotic manipulator controller 120, a version of a programming language associated with the robotic manipulator controller 120, a version of an actuator control protocol associated with the robotic manipulator 110, or other information associated the robotic manipulator 110. The user may interact with the button 760 to instruct the electronic processor 130 to generate a robotic manipulator profile containing information provided by the user in the graphical user interface 700. The generated robotic manipulator profile is stored in a memory or database associated with the electronic processor 130.

Figure 8:
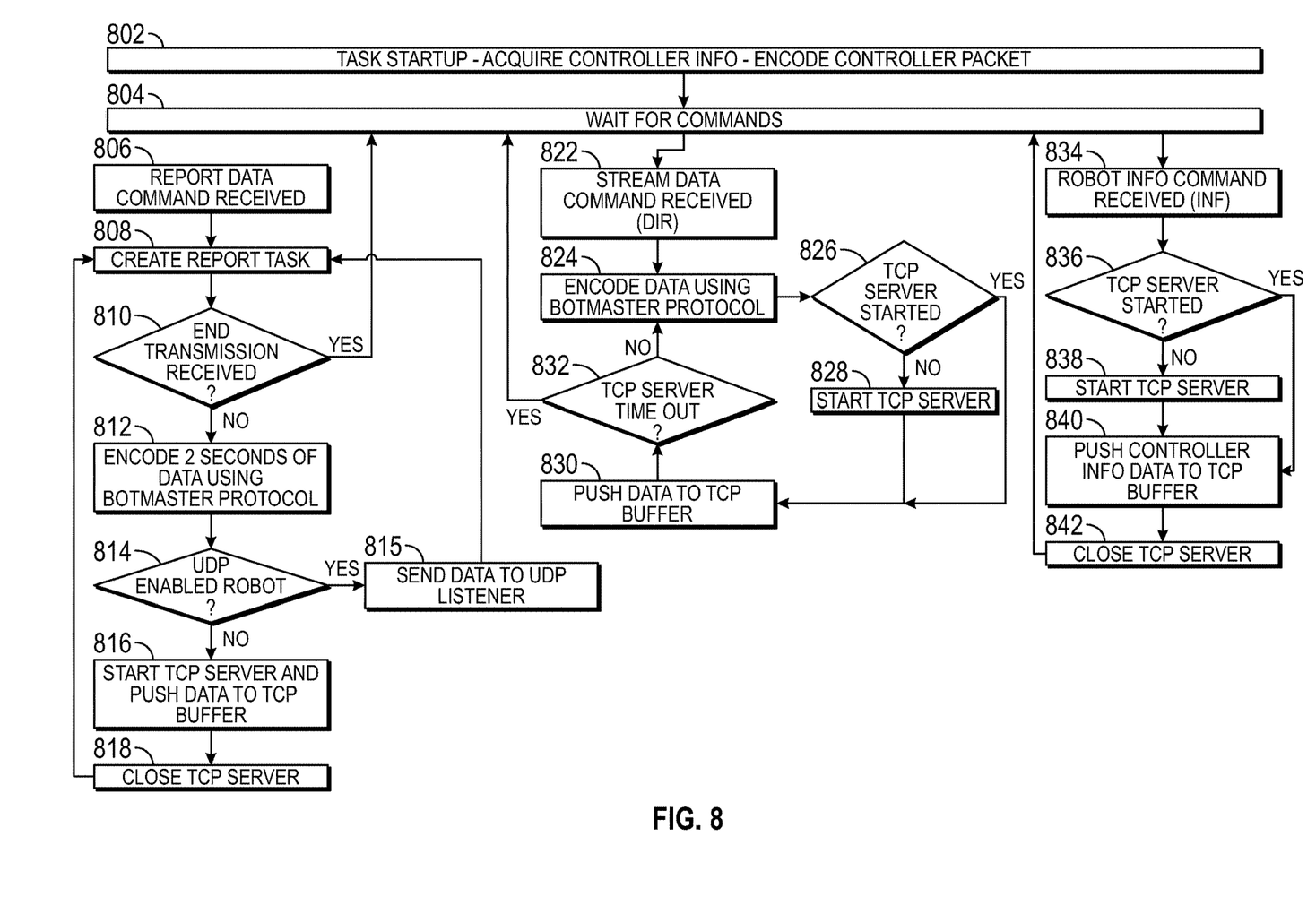
FIG. 8 is a flowchart of a method for transmitting data packets generated by the robotic manipulator controller of FIG. 3, according to some embodiments.

FIG. 8 is a flowchart of an example method 800 for transmitting data packets generated by the robotic manipulator controller 120. The method 800 begins at step 802. At step 802, the electronic processor 130 receives the robotic manipulator profile corresponding to the robotic manipulator 110 associated with the robotic manipulator controller 120. At step 804, the robotic manipulator controller 120 waits to receive an instruction from the electronic processor 130 to begin transmission of data. In some embodiments, the electronic processor 130 continuously attempts to connect to the robotic manipulator controller 120 as a TCP master, wherein the robotic manipulator controller 120 acts as the TCP slave. In some embodiments, when the robotic manipulator 110 is UDP enabled, the electronic processor 130 acts a listener.

Returning to step 804, the method 800 continues to step 806 when the electronic processor 200 of the robotic manipulator controller 120 receives a report data command, in which the electronic processor 200 of the robotic manipulator 120 receives an instruction to begin data transmission to the electronic processor 130. At step 808, the robotic manipulator controller 120 creates a report task in which the plurality of signals generated at block 410 of FIG. 4 are transmitted to the electronic processor 200 of the robotic manipulator controller 120. At step 810, the electronic processor 200 determines if the end of the transmission of the plurality of signals has been received. If the electronic processor 200 determines that the end of the transmission has been received, the method 800 returns to step 804. If the electronic processor 200 determines that the end of the transmission has not been received, the method 800 continues to step 812. At step 812, the electronic processor 200 encodes two seconds of the plurality of signals and generates a data packet according to the structure of the data packet 500 of FIG. 5. At step 814, the electronic processor 200 determines if the robotic manipulator 110 is UDP enabled. If the electronic processor 200 determines that the robotic manipulator 110 is UDP enabled, the method 800 continues to step 815. At step 815, the electronic processor 200 receives the data packet generated at step 812 and outputs the data packet to a UDP listener associated with the electronic processor 120. After the data packet has been output to the UDP listener, the method 800 returns to step 808. If, at step 814, the electronic processor 200 determines that the robotic manipulator is not UDP enabled, the method 800 continues to step 816. At step 816, the electronic processor 200 receives the data packet generated at step 812, generates in instruction to start a TCP server associated with the electronic processor 130, and transmits the data packet to a TCP buffer of the TCP server.

Returning to step 804, the method 800 continues to step 822 when the electronic processor 200 the robotic manipulator controller 120 receives a stream data command from the electronic processor 130. At step 824, the electronic processor 200 encodes the plurality of signals and generates a data packet according to the structure of the data packet 500 of FIG. 5. At step 826, the electronic processor 200 determines if the TCP server has been started. If the electronic processor 200 determines that the TCP server has not been started at step 826, the method 800 continues to step 828 in which the electronic processor 200 generates an instruction to start the TCP server and continues to step 830. If the electronic processor 200 determines that the TCP server has been started at step 826 (for example, at step 816), the method 800 continues to step 830. At step 830, the electronic processor 200 transmits the generated data packet to the TCP buffer of the TCP server. At step 832, the electronic processor 200 determines if the TCP server has timed out. If the electronic processor 200 determines that the TCP server has not timed out, the method 800 returns to step 824. If the electronic processor 200 determines that the TCP server has timed out, the method 800 returns to step 804.

Returning to step 804, the method 800 continues to step 834 when the electronic processor 200 of the robotic manipulator controller 120 receives a robot information command from the electronic processor 130. At step 836, the electronic processor 200 determines if the TCP server has been started. If the electronic processor 200 determines that the TCP server has not been started at step 836, the method 800 continues to step 838 in which the electronic processor 200 generates an instruction to start the TCP server and continues to step 830. If the electronic processor 200 determines that the TCP server has been started at step 836 (for example, at step 816 or 828), the method 800 continues to step 840. At step 840, the electronic processor 200 transmits data representing controller information of the robotic manipulator controller 120 to the TCP buffer of the TCP server associated with the electronic processor 130. At step 842, the electronic processor 200 generates an instruction to close the TCP server, after which the method 800 returns to step 804.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Various features and advantages of the invention are set forth in the following claims.

What is claimed is:

1. A system for monitoring operational data of a robotic manipulator, the system comprising:
    a memory including a robotic manipulator profile, the robotic manipulator profile including a history of robotic manipulator operational data;
    an output device;
    a robotic manipulator controller configured to
        generate a plurality of signals, the plurality of signals including information about an instantaneous joint torque, an instantaneous joint error, an instantaneous tool position, an instantaneous flange position, an instantaneous tool speed, and an instantaneous speed percentage,
        generate a data packet based on the plurality of signals, the data packet containing a plurality of data segments of a predefined size, each data segment in the plurality of data segments including information relating to one of the group consisting of the instantaneous joint torque, the instantaneous joint error, the instantaneous tool position, the instantaneous flange position, the instantaneous tool speed, and the instantaneous speed percentage,
        transmit the data packet to an electronic processor, the electronic processor configured to
            receive the robotic manipulator profile from the memory,
            determine one or more operational characteristics of the robotic manipulator based on the data packet,
            update the robotic manipulator profile based on the one or more operational characteristics,
            generate an alert based on the updated robotic manipulator profile, and
            output the alert to the output device.

2. The system of claim 1, wherein the robotic manipulator is a plurality of robotic manipulators the robotic manipulator controller is configured to
    generate a plurality of signals,
    generate a data packet based on the plurality of signals, and
    store the data packet in the memory;
wherein, each robotic manipulator controller in the plurality of robotic manipulator controllers corresponds to one robotic manipulator of a plurality of robotic manipulators.

3. The system of claim 2, wherein the electronic processor is configured to
    receive one or more data packets stored in the memory,
    determine one or more operational characteristics of the plurality of robotic manipulators,
    generate an alert based on the one or more operational characteristics of the plurality of robotic manipulators, and
    output the alert to the output device.

4. The system of claim 1, wherein the data packet includes one or both of a robotic manipulator identifier and a robotic manipulator group identifier.

5. The system of claim 4, wherein the robotic manipulator identifier includes at least one of the group consisting of an IP address, a serial number, a display name, a communication protocol, a robotic manipulator type, a robotic manipulator configuration, a controller serial number, a software type, and a software version.

6. The system of claim 4, wherein the robotic manipulator group identifier includes at least one of the group consisting of a department of an organization, a function of the robotic manipulator, and a location of the robotic manipulator.

7. The system of claim 1, wherein the alert is further based on one or both of the robotic manipulator identifier and the robotic manipulator group identifier.

8. The system of claim 1, wherein the electronic processor is further configured to
    determine a health status of the robotic manipulator based on the updated robotic manipulator profile,
    generate an alert based on the health status of the robotic manipulator, and
    output the alert to the output device.

9. The system of claim 1, wherein the electronic processor is further configured to
    generate a visual representation of the alert, and
    output the visual representation to the output device.

10. The system of claim 9, wherein the visual representation includes at least one of the group consisting of a graph, a chart, and a table.

11. A method for monitoring operational data of a robotic manipulator, the method comprising:
    generating, with a robotic manipulator controller, a plurality of signals, the plurality of signals including information about an instantaneous joint torque, an instantaneous joint error, an instantaneous tool position, an instantaneous flange position, an instantaneous tool speed, and an instantaneous speed percentage,
    generating, with the robotic manipulator controller, a data packet based on the plurality of signals, the data packet containing a plurality of data segments of a predefined size, each data segment in the plurality of data segments including information relating to one of the group consisting of the instantaneous joint torque, the instantaneous joint error, the instantaneous tool position, the instantaneous flange position, the instantaneous tool speed, and the instantaneous speed percentage, transmitting, with the robotic manipulator controller, the data packet to an electronic processor, receiving, at the electronic processor, a robotic manipulator profile from a memory, the robotic manipulator profile including a history of robotic manipulator operational data, determining, with the electronic processor, one or more operational characteristics of the robotic manipulator based on the data packet, updating, with the electronic processor, the robotic manipulator profile based on the one or more operational characteristics, generating, with the electronic processor, an alert based on the updated robotic manipulator profile, and outputting, with the electronic processor, the alert to an output device.

12. The method of claim 11, wherein the data packet includes one or both of a robotic manipulator identifier and a robotic manipulator group identifier.

13. The method of claim 12, wherein the robotic manipulator identifier includes at least one of the group consisting of an IP address, a serial number, a display name, a communication protocol, a robotic manipulator type, a robotic manipulator configuration, a controller serial number, a software type, and a software version.

14. The method of claim 12, wherein the robotic manipulator group identifier includes at least one of the group consisting of a department of an organization, a function of the robotic manipulator, and a location of the robotic manipulator.

15. The method of claim 11, wherein the alert is further based on one or both of the robotic manipulator identifier and the robotic manipulator group identifier.

16. The method of claim 11, the method further comprising
determining, with the electronic processor, a health status of the robotic manipulator based on the updated robotic manipulator profile,
generating, with the electronic processor, an alert based on the health status of the robotic manipulator, and
outputting, with the electronic processor, the alert to the output device.

17. The method of claim 11, the method further comprising
generating, with the electronic processor, a visual representation of the alert, and
outputting, with the electronic processor, the visual representation to the output device.

18. The method of claim 17, wherein the visual representation includes at least one of the group consisting of a graph, a chart, and a table.

* * * * *